United States Patent
Schwartz et al.

[11] Patent Number: 5,945,885
[45] Date of Patent: Aug. 31, 1999

[54] DIGITAL BASEBAND MODULATOR ADAPTABLE TO DIFFERENT MODULATION TYPES

[75] Inventors: David J Schwartz, Post Falls, Id.; Alan R Bloom; William J. Anklam, both of Santa Rosa, Calif.

[73] Assignee: Hewlett-Packard Company, Palo Alto, Calif.

[21] Appl. No.: 09/035,931

[22] Filed: Mar. 5, 1998

[51] Int. Cl.$^6$ ............ H04L 27/12; H04L 27/20; H04L 27/36

[52] U.S. Cl. .......... 332/100; 332/103; 332/119; 375/205; 375/298; 375/303; 375/308

[58] Field of Search ................ 332/100, 101, 332/103, 104, 119; 375/205, 298, 303, 308

[56] References Cited

U.S. PATENT DOCUMENTS

| | | |
|---|---|---|
| 4,757,519 | 7/1988 | Collison et al. .............. 375/296 |
| 4,843,351 | 6/1989 | Edwards et al. .............. 332/103 |
| 5,633,893 | 5/1997 | Lampe et al. ................ 332/100 |
| 5,694,093 | 12/1997 | DaSilva et al. ............... 332/103 |
| 5,825,828 | 10/1998 | Sasaki ........................ 332/103 |

*Primary Examiner*—Siegfried H. Grimm
*Attorney, Agent, or Firm*—Douglas J. Barker

[57] ABSTRACT

A digital baseband modulator having a flexible architecture that is readily adaptable to a variety of digital modulation types is provided. A symbol builder maps the input data to a series of modulation states corresponding to data symbols that are represented as state indexes. A pair of digital filters accepts the state indexes being generated by the symbol builder to provide both up-sampling and filtering functions. The digital filters are implemented using random access memory (RAM) to implement blocks of interpolating look-up multipliers which may be readily configured between fast, normal, and long modes. The filtered output data from the digital filters is provided to a resampler that converts the filtered output data to an output sample rate that corresponds to the sample rate of output DACs and corresponding analog low pass filters.

11 Claims, 10 Drawing Sheets

DIGITAL BASEBAND MODULATOR ADAPTABLE TO DIFFERENT MODULATION TYPES

BACKGROUND OF THE INVENTION

This invention relates generally to signal generators and in particular to a digital baseband modulator for generating digitally modulated signals.

Wireless communications, including digital cellular telephones and personal communications service (PCS) telephones, are rapidly becoming a major sector of the communications industry. Emerging wireless communications technologies are a driving force behind the rapidly expanding number of digitally modulated signals that must now be accommodated by signal generators, both in the design and manufacturing environments. The wireless system designer who must choose a particular type of digital modulation is faced with a number of challenges. The wireless system must allow for signal strengths that vary over time and location, with multipath, fading and interference.

Wireless handsets are increasingly smaller in size and have limited battery capacity. At the same time, user demands continue to increase for higher data rates, better voice quality, fewer dropped calls, and longer talk times. Designing, manufacturing, and maintaining wireless devices, including both handsets and base stations, requires appropriate test equipment such as signal generators which are capable of generating test signals for precisely simulating real world conditions as well as known signals that conform to industry standards.

Wireline systems, which include cable television and telephone applications, have similarly expanded the types of digital communications to many of the same problems encountered in wireless applications. A discussion of various digitally modulated signal types that exist may be found in "Digital Communication, Second Edition", Lee, Edward, A. and Messerschmitt, David G., Kluwer Academic Publishers, Mass., 1994.

Signal generators must be versatile and adaptable enough to handle both existing and newly created modulation types. During the development of a new wireless system, designers may be faced with the problem of not having a receiver to verify the operation of the newly designed signal generator and no signal generator capable of verifying the operation of the newly designed receiver. A versatile and adaptable signal generator will help in avoiding this dilemma by providing a known test signal by which the performance of the new receiver can be determined without developing specialized signal sources.

Most wireless communications systems now transmit information as digital data. Analog information such as digitized voice is transmitted in the same manner as other digital data. Because the digital information consists of binary 1s and 0s, the digitally modulated radio frequency (RF) carrier has a finite set of modulation states. These modulation states may be defined according to variations in amplitude, phase, or frequency of the RF carrier. In addition, other types of modulation utilizing both amplitude and phase information in the in-phase (I) and quadrature (Q) signals of the RF carrier have been employed to obtain quadrature amplitude modulation (QAM). QAM is one form of IQ modulation.

RF signal generators having built-in modulation capabilities for testing communications systems have existed for many years. Such signal generators include synthesized RF sources that generate RF carrier signals at desired frequencies, such as in the 824–894 MegaHertz (MHz) frequency range for North American cellular telephone. An IQ modulator provides for modulating the RF carrier signal in response to separate I and Q signals which are generated by a baseband modulator.

Prior art baseband modulators were implemented on an ad hoc basis to accommodate new digital modulation signal types. Adding new types of digital modulation signal required additional components and new hardware configurations within the RF signal generator, greatly increasing its cost and complexity. Baseband modulators having customized digital filters and symbol builders were assembled to comply with widely varying digital modulation signal types. Such specialized hardware significantly increased the cost of supporting additional types of digital modulation signal types in the RF signal generator.

As the number of digital modulation signal types continues to rapidly expand, the ability of the baseband modulator to adapt and accommodate these new signal types has become inadequate. Therefore, it would be desirable to provide a digital baseband modulator for RF signal generators that is readily adaptible to the wide variety of existing as well as emerging digital modulation signal types. It would be further desirable that the digital baseband modulator be implemented with lower cost, require less space, and be adaptible with changes in software rather than in hardware to accommodate different types of digital modulation.

SUMMARY OF THE INVENTION

In accordance with the present invention, a digital baseband modulator having a flexible architecture that is readily adaptable to a variety of digital modulation types is provided.

A symbol builder accepts input data that may represent digitized speech or other information to be transmitted as digital modulation. The symbol builder maps the input data to a series of modulation states corresponding to symbols. A selected number of bits of the input data may be used to determine a symbol, depending on the digital modulation type chosen. If IQ modulation is chosen, separate I and Q modulation states are created. The symbol builder outputs the modulation states as indexes to the modulation values (state index) which requires significantly fewer bits than the symbol values themselves in order to increase computational efficiency.

A pair of digital filters accepts the I and Q state indexes being generated by the symbol builder to provide both up-sampling and filtering functions. The digital filters contain blocks of interpolating look-up multipliers which employ a look-up table containing the pre-calculated tap product of each filter constant and symbol value used. The RAM accepts the I and Q state indexes directly as memory addresses in order to reduce the number of operations required to obtain the filtered output value. The digital filter structure may be readily altered using address switching and by changing the contents of its tables of tap products. Up-sampling, the process of increasing the effective sample rate of the input data stream to obtain more than one sample per symbol, is performed using a sub-interval counter to create a tap index which forms part of the address presented to the RAM.

The filtered output data provided by the digital filters is provided to a resampler that converts the sample rate of the filtered output data to an output sample rate. The output sample rate is fixed within an octave and corresponds to the sample rate of output DACs and corresponding analog low pass filters that block undesirable sampling components from the baseband output signal. In the preferred embodiment, the output sample rate varies between 25 and 50 MHz.

In addition to supplying I and Q output signals to the IQ modulator of the RF signal generator, the baseband digital modulator may also be used to produce frequency or phase modulation signals directly to the synthesizer portion of the RF signal generator.

One feature of the present invention is to provide a digital baseband modulator.

Another feature of the present invention is to provide a digital baseband modulator that may be readily adapted for a variety of digital modulation types.

A further feature of the present invention is to provide a digital baseband modulator that may be readily adapted for a variety of digital modulation types by changing software settings.

An additional feature of the present invention is to provide a digital baseband modulator with fewer components, less power consumption, and lower manufacturing cost.

Other features, attainments, and advantages will become apparent to those skilled in the art upon a reading of the following description when taken in conjunction with the accompanying drawings.

DETAILED DESCRIPTION OF THE INVENTION

Figure 1:
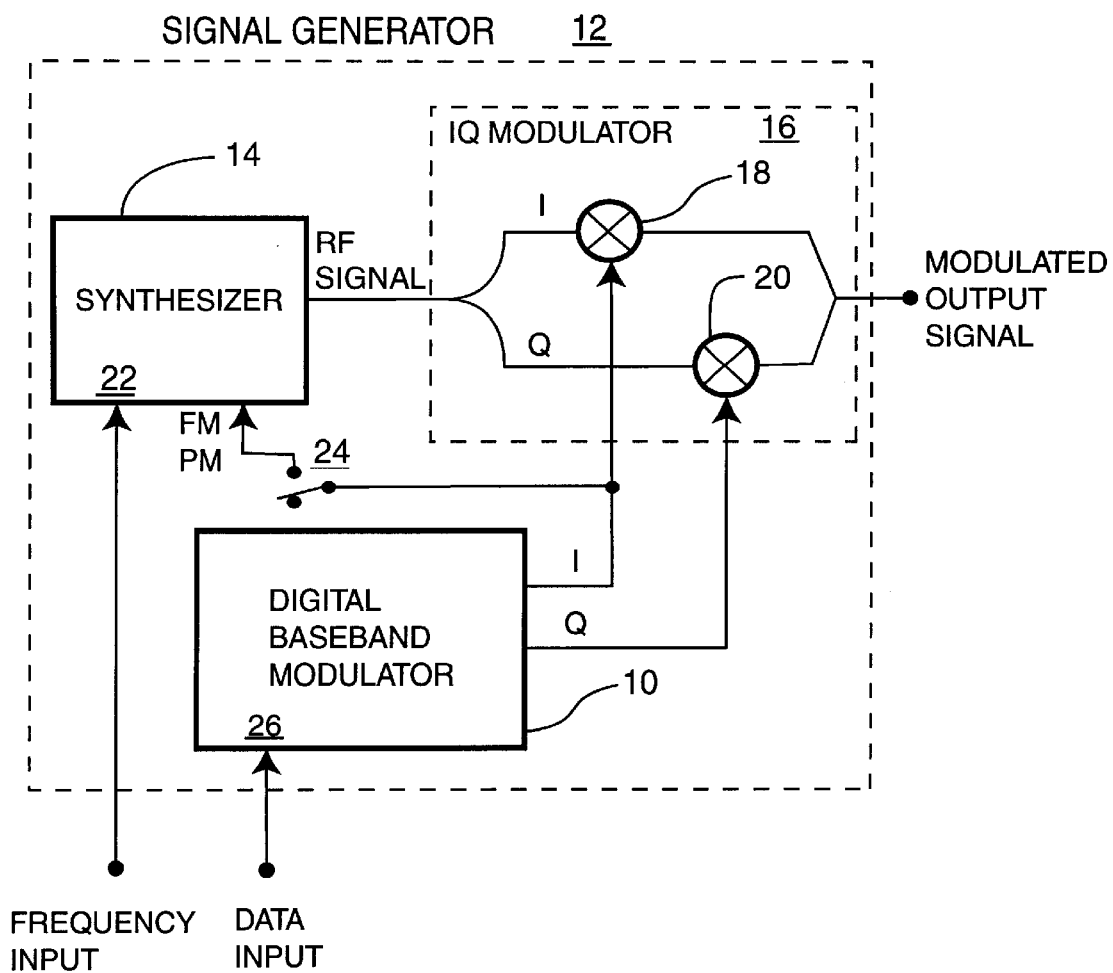
FIG. 1 is a block diagram of a digital baseband modulator according to the present invention as applied in a signal generator.

In FIG. 1 there is shown a block diagram of a digital baseband modulator 10 according to the present invention as applied in a signal generator 12. The signal generator 12 is generally employed to generate test signals, such as in a manufacturing or repair facility for digital communications systems including wireless communications equipment such as cellular telephone handsets and base stations and wireline communications equipment including cable television and telephone systems. Wireless communications have evolved with digital communications technologies including North American Digital Cellular (NADC), Global System for Mobile Communication (GSM), and PCS (personal communications services) among others. Various digital communications protocols have evolved with the various standards including TDMA (time division multiple access) and CDMA (code division multiple access). Various digital modulation types are used for digital communications including quadrature phase shift keying (QPSK). In such applications, it is desirable that the signal generator 12 have the ability to provide test signals according to as many digital communications standards as possible.

Within the signal generator 12, a synthesizer 14 generates an RF signal in the frequency range of interest. The synthesizer 14 has a frequency input 22 connected to a front panel user interface or remote communications interface (not shown) that allows the user to select a frequency for the RF signal, typically with high resolution and accuracy. The RF signal is supplied to an IQ modulator 16 that splits the RF signal into in-phase (I) and quadrature (Q) RF signals. The IQ modulator 16 contains multipliers 18 and 20 that multiply the I and Q RF signals by I and Q baseband signals generated by the digital baseband modulator 10. The I and Q RF signals are recombined to form the modulated output signal for testing digital communications systems. In addition, the I baseband signal may be supplied directly to the synthesizer 14 via a switch 24 if a modulation mode involving direct phase modulation or frequency modulation is required.

The digital baseband modulator 10 has a data input 26 that accepts input digital data such as digitized voice or computer data which may be used to modulate the RF output signal in real-time. The modulation format of the digital baseband modulator 10 may be controlled by the front panel user interface or remote communications interface of the signal generator 12.

Figure 2:
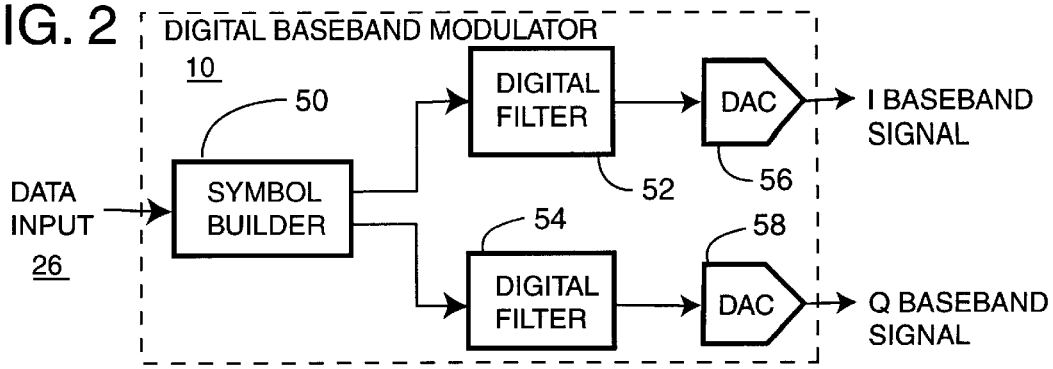
FIG. 2 is a generalized block diagram of the digital baseband modulator.

In FIG. 2 there is shown a generalized block diagram of the digital baseband modulator 10. A symbol builder 50 maps the incoming digital data received at the data input to modulation states. The symbol builder 50 as implemented according to the prior art generates symbol values that represent the data symbols in terms of their analog values. To achieve adequate amplitude resolution for the application, such symbol values typically are 16 bits or more in length, thus requiring higher speed devices or wider data paths to achieve adequate throughput.

Figure 3A:
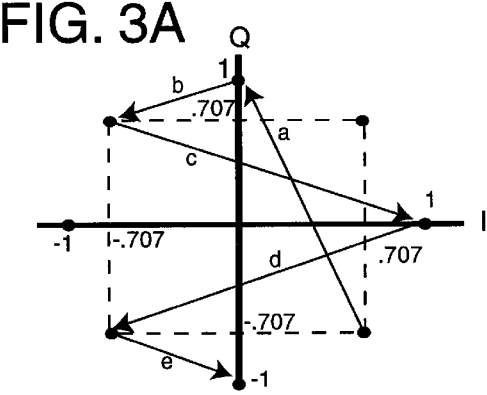
FIGS. 3A–F are graphs showing the relationship of I and Q signals generated by the digital baseband modulator.
Figure 3D:
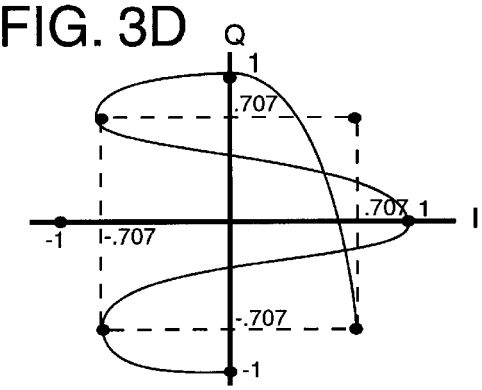
Figure 3B:
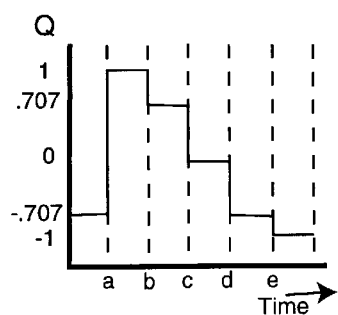
Figure 3E:
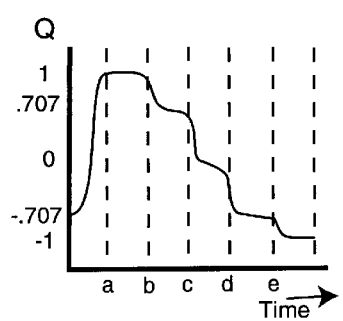
Figure 3C:
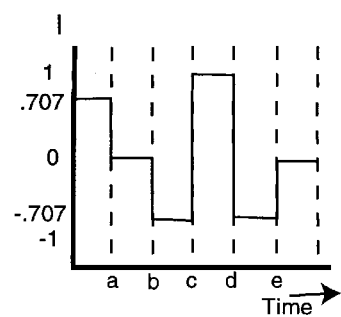

FIGS. 3A–F are shown for purposes of example and illustration for one particular set of data symbols and is not for purposes of limitation. The relationship of symbol values to a set of data symbols is shown in FIG. 3A. In this example, a set of data symbols are shown as dots located on a two dimensional IQ plane defined according to the orthogonal I and Q axes. The input data received at the data input 26 of the digital baseband modulator 10 may be mapped to the set of data symbols that are located on the IQ plane. The successive vectors a–e are the transitions between the data symbols responsive to the arrival of new input data. FIGS. 3B and 3C illustrate how the I and Q symbol values change over time for each of the transitions between the data symbols according to the vectors a–e.

Figure 3F:
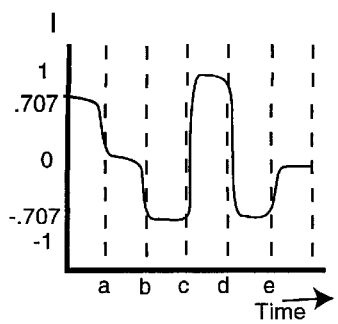

The symbol values are supplied to digital filters 52 and 54. The digital filters 52 and 54 operate to smooth the transitions between each of the symbols and provide interpolated symbol values as intermediate samples over the transition period. The digital filters 52 and 54 are typically implemented as finite impulse response (FIR) filters which have transfer functions that operate to provide a desired output bandwidth of the modulated output signal. FIG. 3D illustrates the transitions between symbols from FIG. 3A that are filtered by the digital filters 52 and 54 to obtain the desired output bandwidth. FIGS. 3E and 3F illustrate how the filtered I and Q symbol values change over time during each of the transitions according to vectors a–e.

The filtered symbol values are then provided to digital to analog converters (DACs) 56 and 58 for conversion to I and Q baseband signals. Low pass filters (not shown) at the outputs of the DACs 56 and 58 may also be provided to remove the sampling components that are present in the I and Q baseband signals according to the sample rate of the DACs 56 and 58.

Figure 4:
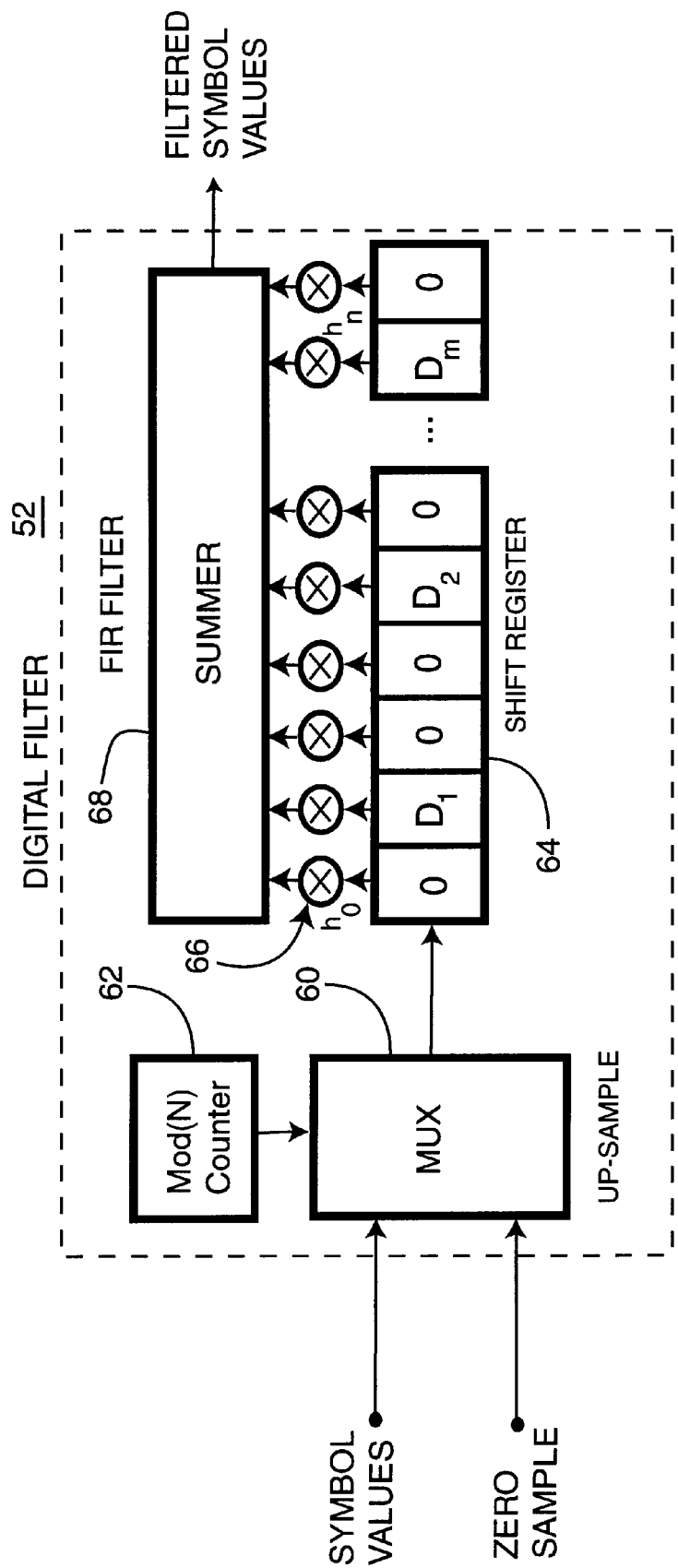
FIG. 4 is a block diagram of the digital filter shown in FIG. 2 implemented using conventional FIR filter techniques.

In FIG. 4, there is shown a more detailed block diagram of the digital filter 52 as may be implemented according to a conventional FIR filter. The symbol values from the symbol builder 50 arrive at a first input of multiplexer (MUX) 60 which has a control input connected to a Mod(N) (modulo-N) counter 62. A second input of the MUX 60 is connected to a zero sample input. The MUX 60 performs an up-sampling operation by inserting N-1 zero samples between each sample value as it arrives to achieve a higher sampling rate. By up-sampling, it is possible to generate interpolated symbol values over each of the transitions according to the vectors a-e at the higher sampling rate in the filtered symbol values.

The up-sampled symbol values produced by the MUX 60 are provided to a shift register 64. As shown, two zero values are inserted between each of the symbol values illustrated as $D_1$, $D_2$, . . . $D_m$ for N=3 or 3 times up-sampling. Each register of the shift register 64 is multiplied by a set of filter constants $h_0, h_1, \ldots h_n$ in a set of multipliers 66 and provided to a summer 68 which sums together each tap product to produce the filtered symbol value. The shift register 64, set of multipliers 66 and summer 68 thus implement a conventional FIR filter which has a transfer function determined by the value of the set of filter constants $h_0, h_1, \ldots h_n$.

While relatively straightforward to implement, the conventional FIR filter has some limitations. Multiplying a filter constant by the zero value and summing the tap product in the conventional FIR filter is not computationally efficient because the result does not contribute to the filtered symbol value. Multiply operations in general are not computationally efficient, often requiring a number of clock cycles to execute using a microprocessor.

Figure 5:
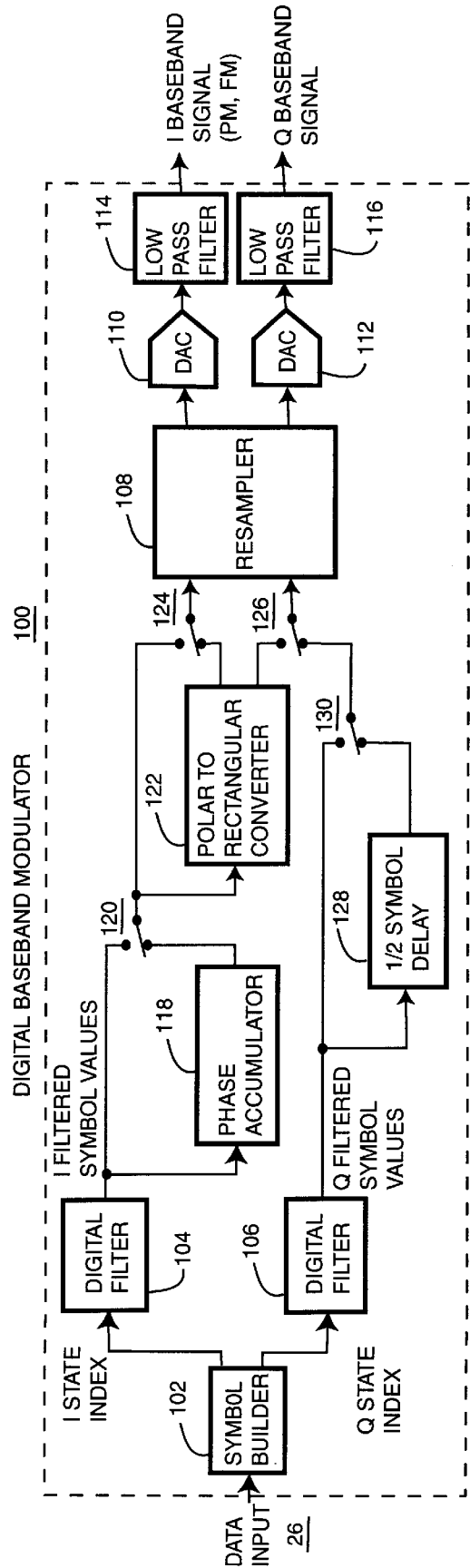
FIG. 5 is a block diagram of the digital baseband modulator according to the present invention.

FIG. 5 is a block diagram of a digital baseband modulator 100 according to the present invention. A symbol builder 102 maps digital data received at the data input 26 to modulation states in a manner similar to the symbol builder 50 shown in FIG. 2. However, instead of symbol values, the symbol builder 102 produces state indexes including an I state index and a Q state index. In the preferred embodiment, the mapping can be performed for up to 256 unique symbol states, composed of two vectors of up to 16 symbol states each. The vectors can alternatively represent I and Q, or a combination of frequency, amplitude, or phase as needed for the selected modulation type being generated. With up to 256 symbol states, the symbol builder can therefore handle digital modulation types with up to 8 bits of input data per symbol. The operation of the symbol builder 102 according to the present invention is explained in more detail below.

The I state index and Q state index are provided to digital filters 104 and 106. The I state index and Q state index are used in lieu of the equivalent symbol values as a way to address the table of products that are stored in RAM within each of the digital filters 104 and 106. The digital filters 104 and 106 have up-sampling and filtering operations which produce the filtered symbol values similar to those produced by the digital filters 52 and 54 (shown in FIG. 2) but in a distinctly different manner. The digital filters 104 and 106 have been implemented in a manner that maximizes the symbol throughput rate with computational efficiency. At the same time, the digital filters 104 and 106 maximize the versatility of the digital baseband modulator 100 by being readily configurable. In the preferred embodiment, the digital filters 104 and 106 are implemented using only application specific integrated circuits (ASICs) which contain all of the RAM used in the digital baseband modulator 100 to minimize component count. The operation of the digital filters 104 and 106 is explained in more detail below.

The I and Q filtered symbol values produced by the digital filters 104 and 106 are provided to a resampler 108. The resampler 108 converts the I and Q filtered symbol values received at an input sample rate to an output sample rate. The output sample rate may vary over the octave between 25 and 50 MHz in the preferred embodiment. The ratio between the input sample rate and the output sample rate is a programmable integer parameter. Re-sampling techniques to effectively change the sample rate up or down while preserving frequency information are discussed in U.S. Pat. No. 5,235,534, "METHOD AND APPARATUS FOR INTERPOLATING BETWEEN DATA SAMPLES", issued Aug. 10, 1993, to Ronald W. Potter and assigned to Hewlett-Packard Company.

The resampled symbol values produced by the resampler 108 are provided to DACs 110 and 112 which convert the resampled symbol values to analog voltages at the output sample rate. Low pass filters 114 and 116 are analog reconstruction filters that operate to block the sampling components that appear near multiples of the output sample rate while having a transfer function that provides the I and Q baseband signals with substantially flat amplitude and group delay versus frequency characteristics over the desired output signal bandwidth.

For frequency shift key (FSK) modulation, the I baseband signal may be supplied directly to the synthesizer 14 via the switch 24 (shown in FIG. 1). The Q baseband signal would not normally be used in this case.

Alternatively, FSK and PSK (phase shift keying) may be generated using the I and Q baseband signals applied to the IQ modulator 16. Interposed between the resampler 108 and the digital filter 104 is a phase accumulator 118 which may be selectively switched in via switch 120 to support FSK modulation. Interposed between the phase accumulator 118 and resampler 108 is a polar to rectangular converter 122 which may be selectively switched in via switches 124 and 126. The phase accumulator 118 keeps track of the instantaneous phase of the I baseband signal for the polar to rectangular converter 122 for FSK modulation. Since it is not possible to transform the phase domain (polar) to the I and Q domain (rectangular) before filtering because the transformation is non-linear, it is necessary that the polar to rectangular converter 122 operate to perform a translation from the phase domain to the I and Q domain. For this method of generating FSK and PSK modulation, the polar to rectangular converter 122 receives the I filtered symbol values from the digital filter 104 and produces both the I and Q baseband signals. The phase accumulator 118 is used only for generating FSK according to this method.

Interposed between the digital filter 106 and the resampler 108 is a ½ symbol delay 128 which may be selectively switched in via switch 130. The ½ symbol delay 128 provides for a selected amount of offset between the filtered I and Q symbol values in order to support various types of offset modulations, such as offset quadrature phase shift key (OQPSK) modulation.

The advantages of the digital baseband modulator 100 according to the present invention that include high symbol throughput, ready adaptibility, and low component count are achieved with the symbol builder 102 generating I and Q state indexes which are operated on by the digital filters 104 and 106 as explained in more detail below.

Figure 6:
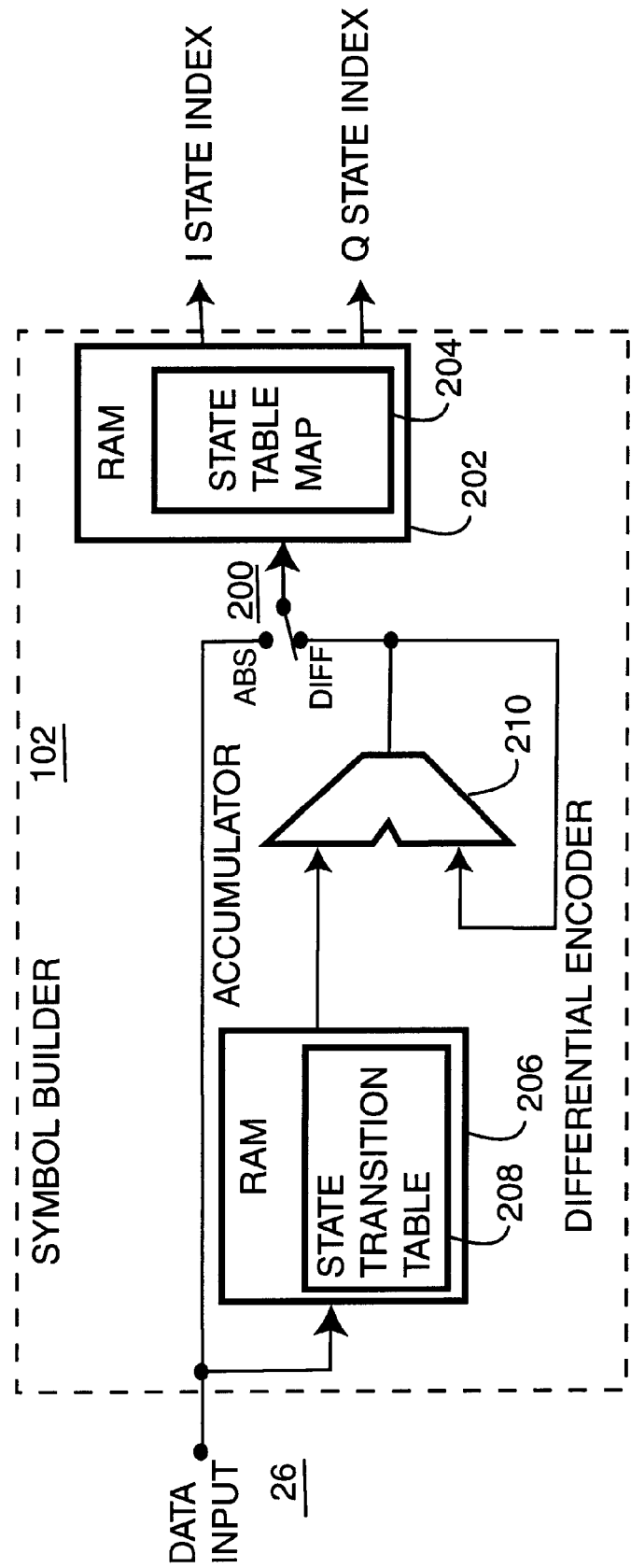
FIG. 6 is a detailed block diagram of the symbol builder shown in FIG. 5.

In FIG. 6 there is shown a detailed block diagram of the symbol builder 102. The input data arrives as parallel 8 bit data words, with each data word being used to define a data symbol to achieve the highest symbol throughput. Several different modulation formats may be accommodated in the symbol builder 102, including absolute modulation formats and differential modulation formats, which are selected with a switch 200.

For absolute modulation formats, the input data received at the data input 26 are coupled directly as data words to an address input of a random access memory (RAM) 202 containing a state table map 204. The state table map 204 is accessed according to the input data to map each data word to a data symbol which is in the form of the I state index and Q state index. As each data symbol is accessed, the I and Q symbol indexes appear at an output of the RAM 202. For IQ modulation, each possible data symbol must map to an absolute location on the IQ plane, with no dependency between successive symbols. An example of an absolute modulation format is QPSK.

Differential modulation formats, on the other hand, require that the input data be mapped to the changes between modulation states. With the switch 200 in the differential position, the input data are coupled to an address input of a RAM 206 containing a state transition table 208. The output of the RAM 206 is connected to an accumulator 210. From the input data received as data words at the address input of the RAM 206, the state transition table 208 is accessed to map the each data word to an increment value. The increment value is added to the current modulation state stored in the accumulator 210 to obtain the new modulation state. The modulus of the accumulator 210 is preferably set to equal the number of states in the desired modulation format so that its output will wrap around. The new modulation state is then provided to the RAM 202 to obtain the I state index and Q state index according to the state table map 204.

In FIGS. 7, 8, 9 and 10, the detailed operation of the digital filters 104 and 106 is described. The digital filters 104 and 106 are implemented using blocks of interpolating look-up multipliers. Instead of performing a multiplication operation for each filter constant and symbol value as is shown for the conventional FIR filter in FIG. 4, a RAM-based look-up table containing the pre-calculated tap product of each filter constant and symbol value is used. Retrieving the contents from RAM can generally be done with one clock cycle whereas a multiplication operation requires either multiple clock cycles or a substantial amount of digital logic. For example, a 16-bit, single cycle multiplier would require sixteen 16-bit adders and 16 switches according to known digital design techniques.

Up-sampling is achieved in the digital filters 104 and 106 by using a tap index as part of the address for the look-up table, with the tap index operating at the higher output sampling rate to achieve the up-sampling operation. It was discovered that various filter structures using the interpolating look-up multipliers could be readily deployed to take advantage of the tradeoffs between the number of samples per data symbol, filter blocks, and speed of operation in a RAM having a fixed size. Up-sampling rate refers to the relative increase in sampling rate that was previously accomplished through the insertion of zero samples in the conventional FIR filter illustrated in FIG. 4 to allow for interpolation during the transitions between symbols. "Filter blocks" refers to the number of taps available in the digital filters 104 and 106. Speed of operation refers to the number of symbols per second that can be processed by the digital filters 104 and 106.

Figure 7:
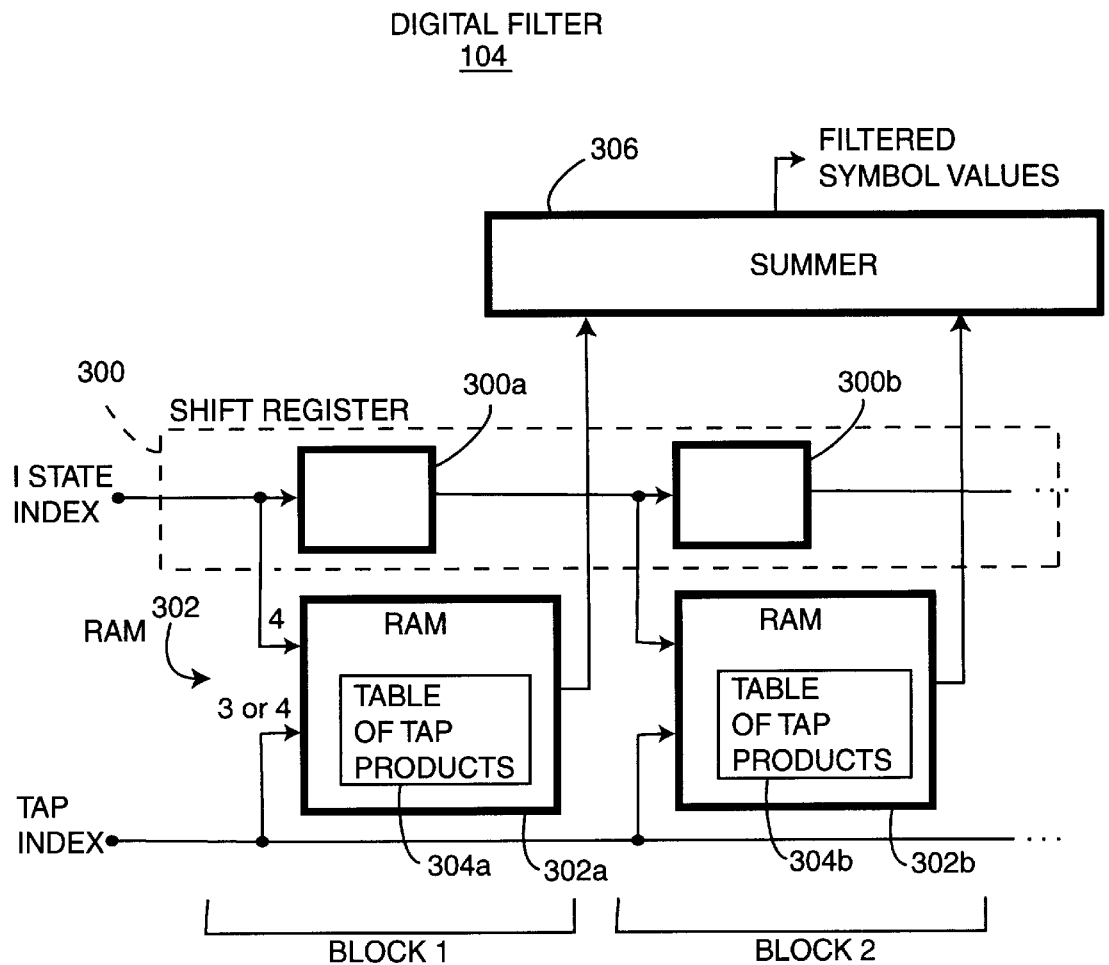
FIG. 7 is a detailed block diagram of a portion of the digital filter shown in FIG. 5.
Figure 8:
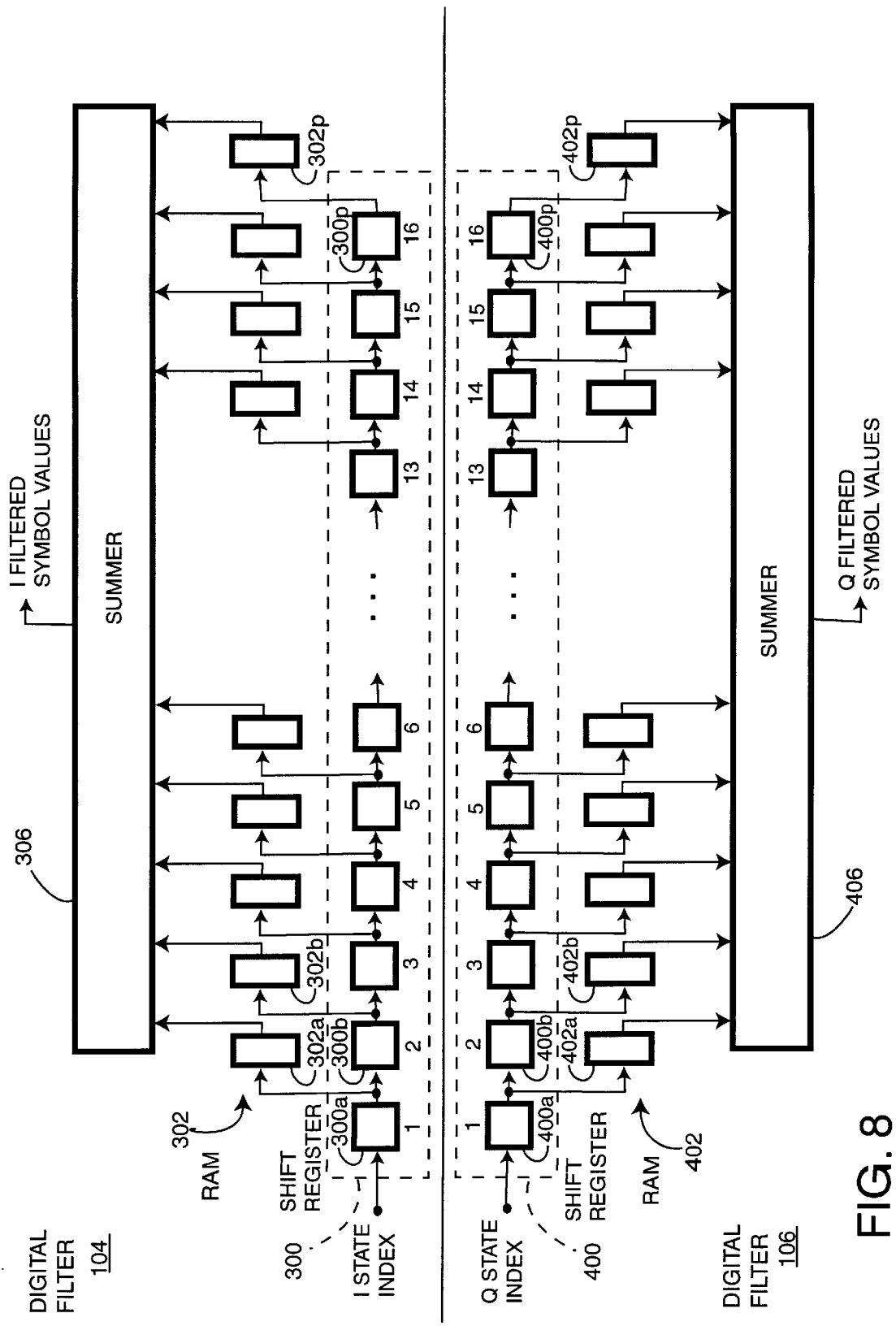
FIG. 8 is a block diagram showing the fast mode of the digital filter using the block shown in FIG. 7.
Figure 9:
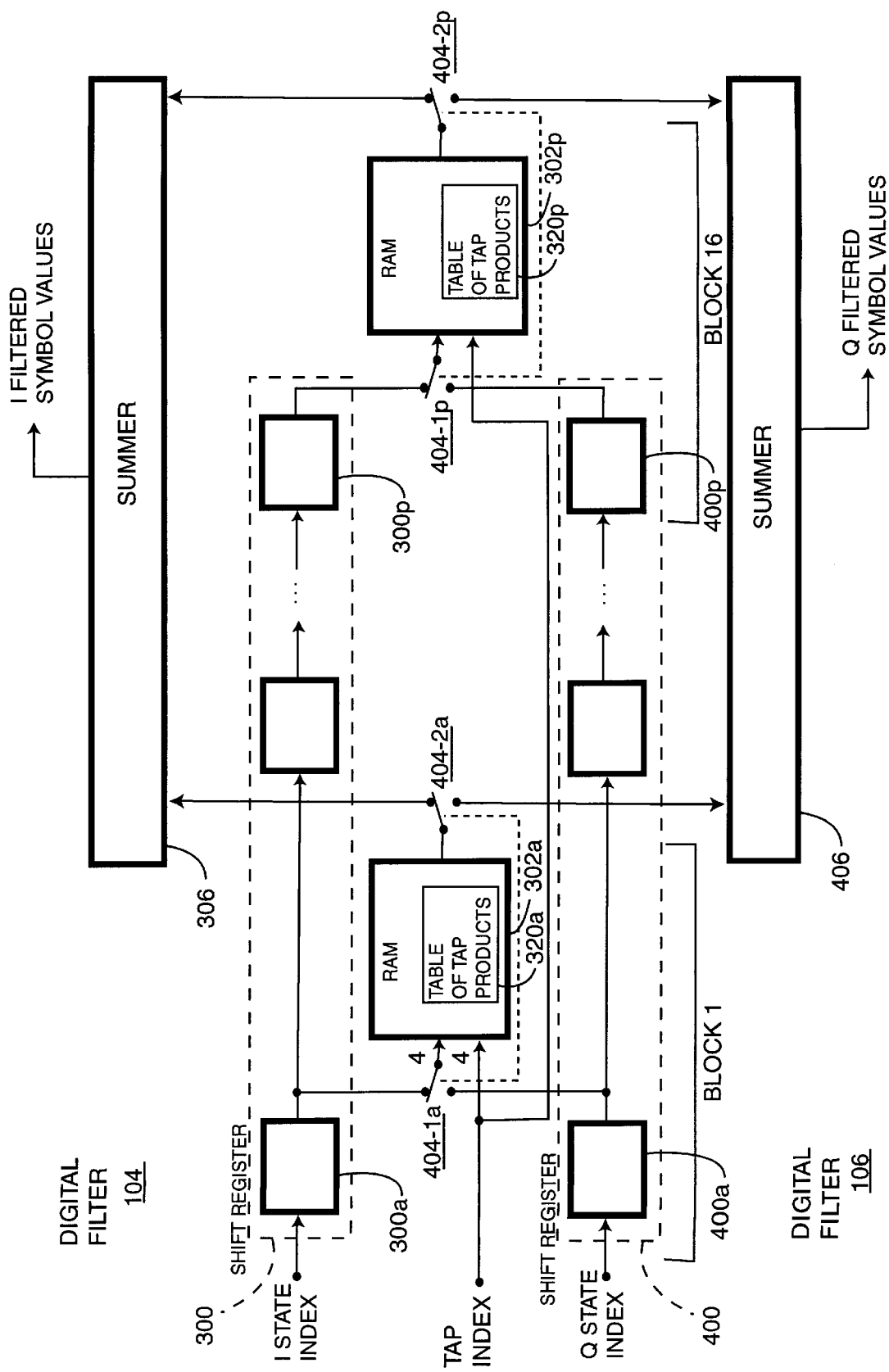
FIG. 9 is a block diagram showing the normal mode of the digital filter.
Figure 10:
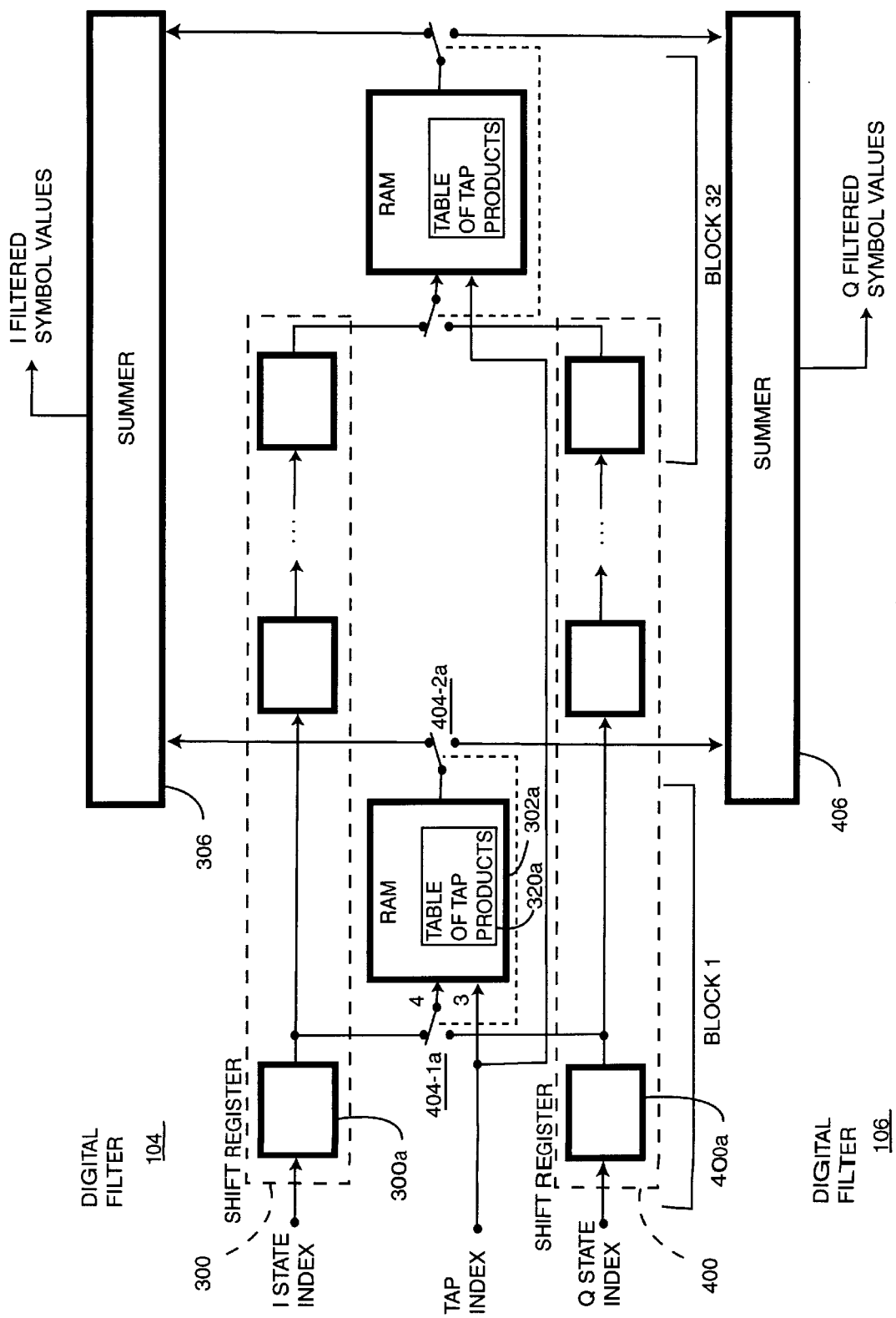
FIG. 10 is a block diagram showing the long mode of the digital filter.

The digital filters 104 and 106 are readily configurable between a set of digital filter configurations according to the present invention, including a fast mode, a normal mode, and a long mode, with their key attributes illustrated in Table 1. FIG. 7 illustrates a portion of the digital filter 104 that implements the interpolating look-up multiplier that forms the block on which the various modes are constructed. FIG. 8 illustrates the fast mode. FIG. 9 illustrates the normal mode. FIG. 10 illustrates the long mode. The set of digital filter configurations is achieved by dividing the RAM 302 into different block sizes by switching address and data lines.

TABLE 1

| Digital Filter Configurations | | | |
|---|---|---|---|
| | Fast Mode | Normal Mode | Long Mode |
| Filter Blocks | 32 | 16 | 32 |
| Number of Symbols | 16 | 16 | 32 |
| Samples per Symbol | 8 | 16 | 8 |
| Sample Rate | 50 MHz | 25 MHz | 25 MHz |

In FIG. 7 there is shown a detailed block diagram of a portion of the digital filter 104 that implements the interpolating look-up multiplier. Only two blocks, labeled BLOCK 1 and BLOCK 2 are illustrated. A total of between 16 and 32 blocks are implemented in the digital filters 104 and 106 according to the preferred embodiment. The digital filter 106 is implemented in the same manner. In contrast to the digital filter 52 shown in FIG. 4 which operates on symbol values, the digital filters 104 and 106 according to the present invention operate on the I and Q state indexes generated by the symbol builder 102 as described above.

The I state index is provided to a shift register 300 which contains registers 300a, 300b, and so on, which are connected in series and also to an address input of a RAM 302a. Each I state index is shifted through the registers 300a, 300b, and so on, at the input sample rate.

A tap index is provided to the address input of the RAM 302a. The I state index and tap index together form the composite address presented to the RAM 302a. The RAM 302a contains a table of tap products 304a that contain the tap products of filter constants and symbol values for the tap formed by BLOCK 1. The tap index operates to achieve up-sampling by cycling through the desired number of subintervals at the output sample rate. No zero samples are inserted in the shift register 300 since the product of a zero sample and a filter constant is zero. The effect of inserting zero samples is thus efficiently implemented by using the tap index. The tap product from the table of tap products 304a is provided to a summer 306. The register 300a and the RAM 302a containing the table of tap products 304a collectively form the block labeled BLOCK 1. A second block, labeled BLOCK 2, consisting of the register 300b, the RAM 302b, and the table of tap products 304b is also shown. The tap product from each of the blocks is provided to the summer 306 which sums all of the tap products to produce filtered symbol values. The contents of the tables of tap products 304a and 304b, as well as the other tables of tap products for other blocks, will likely differ, depending on the desired transfer function of the digital filters 104 and 106.

The tap index is three bits wide to allow for 8 samples per symbol in the fast mode and the long mode. The composite address formed by the state index and tap index is thus 7 bits wide requiring a RAM 302 with 128 words in size, with each data word addressable by the 7 bit wide address.

The tap index is four bits wide to allow for 16 samples per symbol in the normal mode. The composite address formed by the state index and tap index in this case is 8 bits wide requiring the RAM 302a and 302b to be configured to be 256 words in size, with each data word addressable by the 8 bit wide address.

FIG. 8 is a block diagram illustrating the overall architecture of the digital filters 104 and 106 configured for the fast mode. The tap index (shown in FIG. 7) has been omitted for clarity. The digital filter 104 shown on the upper half of the block diagram receives the I state index at the shift register 300 while the digital filter 106 shown on the lower half receives the Q state index at the shift register 400. The digital filters 104 and 106 are both 16 blocks in length, with a total of 32 blocks between them. The RAM 302 and 402 operate at rate up to 50 MHz, depending on the selected amount of up-sampling and the maximum speed of the RAM 302 and 402 and associated circuits.

In the fast mode, the RAM 302 is accessed only once per output sample, allowing the output sample rate to be equal to the master clock rate of 50 MHz. The highest master clock rate may be chosen depending on the maximum speed of the particular integrated circuit technology that is used to implement the digital baseband modulator 100. The tap values from the RAM 302a–p are provided to the summer 306 which produces the I filtered symbol values. The tap values from the RAM 402a–p are provided to a summer 406 to produce Q filtered symbol values.

FIG. 9 illustrates the overall architecture of the digital filters 104 and 106 that have been combined in normal mode. The I state index is received at the shift register 300 and the Q state index is received at the shift register 400. The RAM 302a has been reconfigured to 256 words in size, with four bits received alternatively from the register 300a and then from the register 400a via a switch 404-1a. The tap index forms the other four address bits. The output of the RAM 302a is alternatively provided to the summer 306 and to the summer 406 via a switch 404-2a. The switches 404-1a and 404-2a are ganged to toggle together for each master clock cycle which allows the RAM 302a to be shared between the I and Q digital filter paths. In this way, the number of words that may be accessed per block is doubled but at the tradeoff of symbol rate which has been halved to 25 MHz from 50 MHz for the fast mode. The registers 300a and 400a and the RAM 302a containing a table of tap products 320a collectively form a block labeled BLOCK 1. A total of 16 blocks are used in the normal mode. The tap values from the RAM 302a–p are alternatively provided via the switches 404-2a to 404-2p to the summer 306 and the summer 406 which produce the I and Q filtered symbol values.

FIG. 10 illustrates the overall architecture of the digital filters 104 and 106 which have been combined in long mode. The I state index is received at the shift register 300 and the Q state index is received at the shift register 400. The RAM 302a has been reconfigured to 128 words, with four bits received alternatively from the register 300a and then from the register 400a via the switch 404-1a. The tap index has been reduced from four to three address bits while the number of blocks has been increased from 16 to 32. Thus, a tradeoff of number of symbols per sample was made against filter blocks between the normal mode and long mode. The ready reconfiguration of the digital filters 104 and 106 between the fast mode, normal mode, and long mode allows for greater versatility in accommodating the many different types of digital modulation.

Figure 11:
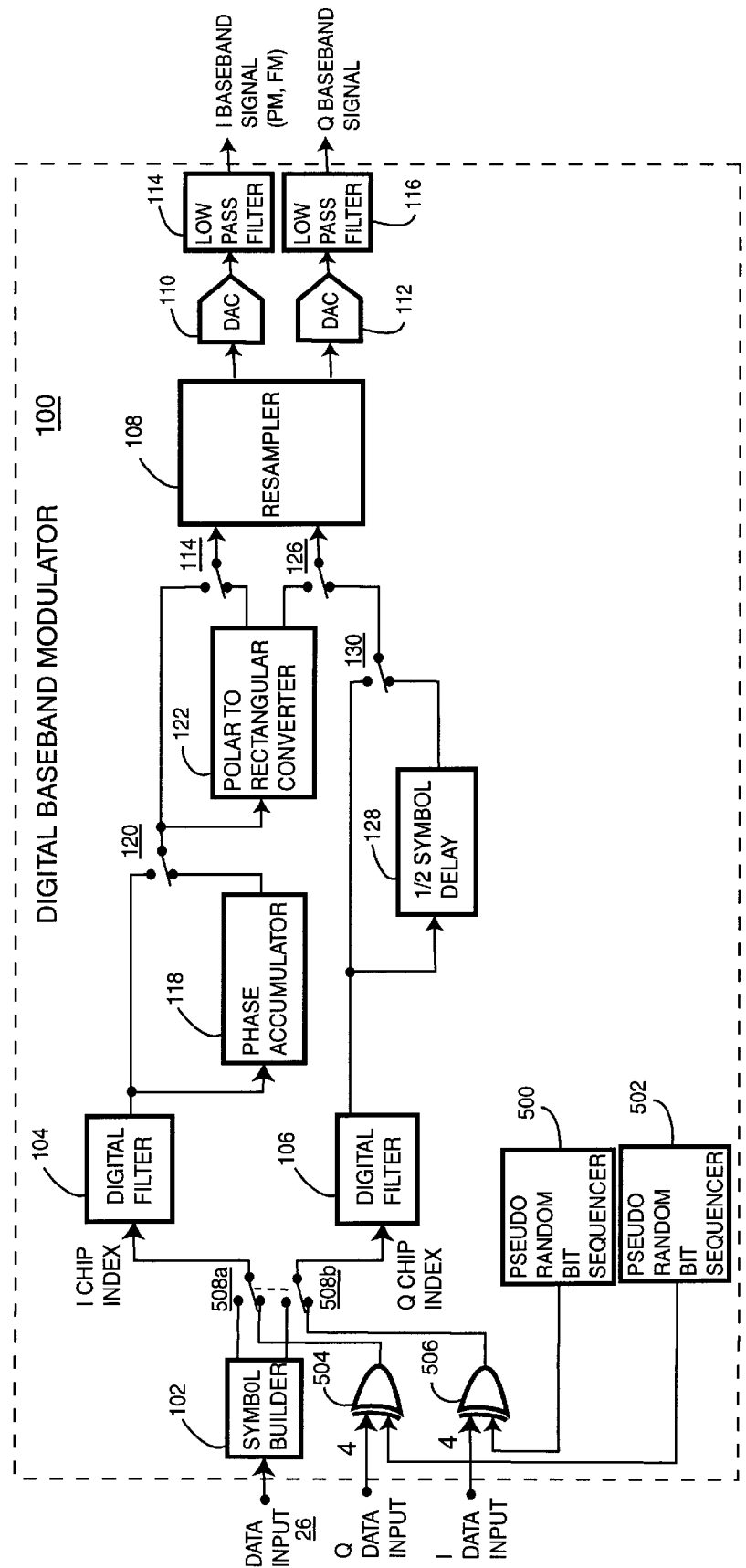
FIG. 11 an alternative embodiment of the digital baseband modulator shown in FIG. 5 that accommodates CDMA signals.

In FIG. 11 there is shown an alternative embodiment of the digital baseband modulator 100 according to the present invention which accommodates code division multiple access (CDMA) digital modulation, commonly known as spread spectrum. Pseudo-Random Bit Sequencers (PRBS) 500 and 502 are connected via XOR gates 504 and 506 and further via the switch 508a–b to the digital filters 104 and 106. The switch 508a–b selects the source of the data input between the symbol builder 102 in normal mode and the PRBS 500 and 502 via XOR gates 504 and 506 with the digital baseband modulator 100 in CDMA mode. For operation as described above, the symbol builder 102 is selected with the switch 508a–b in the up position for normal mode. For operation in the CDMA mode, the switch 508a–b is in the down position.

The PRBS 500 and 502 which can be programmed contain pseudo-random, repeating digital sequences such as those that implement CDMA. An example of CDMA according to industry standards includes EIA/TIA (Electronic Industries Association/Telecommunications Industry Association) Industry Standard 95 (IS-95). The digital filters 104 and 106 may be readily configured to implement filter transfer functions in conformance with current industry standards such IS-95 while maintaining the versatility to conform to emerging industry standards. I and Q data inputs are received at inputs to the XOR gates 504 and 506.

According to the IS-95 standard, the I and Q data inputs are same and would be connected in parallel in the present invention. The I and Q data inputs each have four lines, representing four channels of CDMA. The PRBS 500 and 502 generate bit sequences of equal length but different content that are applied through the XOR gates 504 and 506 together with the 4 CDMA channels to form the composite products at the outputs of the XOR gates 504 and 506 called an I chip index and a Q chip index. The digital filters 104 and 106 operate to filter the I and Q chip indexes in the manner described above.

The up-sampling and interpolation operations in the digital filters 104 and 106 are available in the CDMA mode, along with the advantages of the RAM-based look-up multiplier in the digital filters 104 and 106 to obtain high symbol throughput. Because the states of the 4 CDMA channels determine the symbol state directly, there is no need for the symbol builder 102 in the digital baseband modulator 100 in the CDMA mode and it may be omitted if only CDMA modulation is to be generated.

It will be obvious to those having ordinary skill in the art that many changes may be made in the details of the above-described preferred embodiments of the invention without departing from the spirit of the invention in its broader aspects. For example, the digital filters 104 and 106 may be readily configured in many other structures and combinations in terms of samples per symbol, output sample rate, and number of blocks. Larger or smaller RAM sizes may be readily substituted for the RAM 302 and 402. Therefore, the scope of the present invention should be determined by the following claims.

What we claim as our invention is:

1. A digital baseband modulator comprising:
   (a) a symbol builder having a data input for receiving input data wherein said symbol builder produces an I state index and a Q state index according to said input data;
   (b) first and second digital filters coupled to said symbol builder for receiving said I state index and said Q state index to produce I and Q filtered symbol values;
   (c) a resampler coupled to said first and second digital filters to receive said I and Q filtered sample values at an input sample rate wherein said resampler resamples said I and Q filtered symbol values at an output sample rate; and
   (d) first and second digital to analog converters coupled to said resampler to receive said I and Q filtered symbol values wherein said first and second digital to analog converters produce I and Q baseband signals at said output sample rate.

2. A digital baseband modulator according to claim 1 wherein said first and second digital filters up-sample and filter said I state index and said Q state index to produce said I and Q filtered symbol values.

3. A digital baseband modulator according to claim 1 further comprising first and second low pass filters coupled to said first and second digital to analog converters to filter said I and Q baseband signals according to said output sample rate.

4. A digital baseband modulator according to claim 1 further comprising:
   (a) a phase accumulator interposed between said first digital filter and said resampler, and
   (b) a polar to rectangular converter interposed between said phase accumulator and said resampler wherein said phase accumulator and said polar to rectangular converter provide for conversion of said I filtered symbol values from a phase domain to a rectangular domain.

5. A digital baseband modulator according to claim 1 further comprising a ½ symbol delay interposed between said second digital filter and said resampler to provide a selected amount of offset between said I and Q filtered symbol values.

6. A digital baseband modulator according to claim 1 wherein said symbol builder accommodates absolute modulation formats and differential modulation formats.

7. A digital baseband modulator according to claim 6, said symbol builder comprising:
   (a) a state transition table for mapping said input data to an increment value;
   (b) an accumulator coupled to said state transition table to receive said increment value wherein said accumulator adds said increment value to a current modulator state stored in said accumulator; and
   (c) a state table map for selectively receiving said input data for said absolute modulation formats and said current modulation state for said differential modulation formats wherein said state table map produces said I and Q state indexes.

8. A digital baseband modulator according to claim 1 wherein said first and second digital filters have a set of digital filter configurations comprising a fast mode, a normal mode, and a slow mode.

9. A digital baseband modulator according to claim 8, said first and second digital filters comprising:
   (a) first and second shift registers coupled to said data input to receive said I and Q state indexes;
   (b) a plurality of tables of tap products stored in a RAM, said table of tap products coupled to said first and second shift registers to receive said I and Q state indexes and a tap index wherein said plurality of tables produces tap products responsive to said I and Q state indexes and said tap index;
   (c) first and second summers coupled to each of plurality of tables of tap products to receive said tap products wherein said first and second summers produce said I and Q filtered output data.

10. A digital baseband modulator according to claim 1 wherein said digital baseband modulator has a normal mode and a CDMA mode.

11. A digital baseband modulator according to claim 10, said digital baseband modulator in CDMA mode, further comprising first and second pseudo-random bit sequencers coupled to said first and second digital filters wherein said first and second pseudo-random bit sequencers generate an I chip index and a Q chip index which are filtered by said first and second digital filters.

* * * * *